United States Patent

[11] 3,630,038

| | | |
|---|---|---|
| [72] | Inventor | Masao Ando<br>Yokohamashi, Japan |
| [21] | Appl. No. | 75,918 |
| [22] | Filed | Sept. 28, 1970 |
| [45] | Patented | Dec. 28, 1971 |
| [73] | Assignee | Chisso Corporation<br>Osaka, Japan |
| [32] | Priority | Oct. 16, 1969 |
| [33] | | Japan |
| [31] | | 44/82717 |

[54] METHOD FOR LAYING AN UNDERGROUND PIPELINE
5 Claims, 5 Drawing Figs.

[52] U.S. Cl. .................................... 61/72.1,
138/33, 219/301
[51] Int. Cl. ...................................... F16l 1/00,
F24h 1/14, F16l 53/00
[50] Field of Search ........................... 61/72.1,
72.5, 72.7; 219/10.49, 301; 138/32, 33; 62/56

[56] References Cited
UNITED STATES PATENTS

| 3,293,407 | 12/1966 | Ando | 219/301 |
|---|---|---|---|
| 3,335,251 | 8/1967 | Rolfes | 219/10.49 X |
| 3,410,977 | 11/1968 | Ando | 219/10.49 |

*Primary Examiner*—Jacob Shapiro
*Attorney*—Fred C. Philpitt

ABSTRACT: A method for laying underground a long-distance pipeline, such as a transportation pipeline for heavy oil, which is used in a state laid underground and heated to a higher temperature than that of the earth by means of a heat-generating pipe utilizing skin effect current, attached to each pipe of said pipeline, at the working time, which comprises a combination of steps consisting of (1) a step of heating each pipe of the pipeline by passing alternating current through the heat-generating pipe utilizing skin effect current attached to said each pipe to elongate said each pipe, to a length between the length of the pipe at the temperature of environmental earth and the length of the pipe at the operation temperature, (2) a step of connecting each pipe thus elongated, and (3) a step of backfilling the earth on each pipe, whereby said pipeline is fixed by the earth pressure.

Thus, failure of pipe due to expansion stress can be prevented without attaching any expansion joint or bend.

METHOD FOR LAYING AN UNDERGROUND PIPELINE

DESCRIPTION OF THE INVENTION

The present invention relates to a method for laying underground a pipeline which is used at an elevated temperature.

Recently, a long-distance pipeline such as a transporting pipeline for heavy oil has often been laid underground and used at an elevated temperature. In such a case, pipes are usually laid underground at environmental temperature, but, in the actual operation state, a thermal stress occurs in the pipes because of their temperature rise, and such a stress often breaks the pipes if it exceeds an allowable value for the pipe material.

Thus, the pipeline is usually provided with expansion joints or bends at an appropriate interval to prevent the failure.

Now, explanation will be given to a thermal stress which occurs in a pipe laid underground and having a temperature change. If symbols are designated as follows:

| | | |
|---|---|---|
| $F_1$ | thermal stress due to temperature difference ($\theta_1-\theta_2$) | kg. |
| D | diameter of pipe | cm. |
| t | thickness of pipe wall | cm. |
| $\gamma$ | frictional force per unit area of pipe between the surface of pipe and earth | kg./cm.² |
| $\alpha$ | linear expansion coefficient of pipe | °C.⁻¹ |
| l | length of pipe | cm. |
| E | longitudinal elastic modulus of pipe | kg./cm.² |
| $\theta_1$ | temperature of pipe after heated | °C. |
| $\theta_2$ | temperature of pipe at environmental temperature (temperature of earth) | °C. |
| f | frictional coefficient between the surface of pipe and earth | |
| P | pressure of earth | kg./cm.² |
| $F_2$ | frictional force added to pipe by pressure of earth | kg. |
| $\sigma$ | stress per unit area in pipe (compression stress) | kg./cm.² | then the pipe will elongate by $\alpha(\theta_1-\theta_2)$ per unit length, but if there is an external force equal to $F_1$ expressed by the following equation, $$F_1 \approx \alpha(\theta_1-\theta_2)E\pi Dt \quad (1)$$

the pipe does not elongate.

On the other hand, a frictional force due to the earth pressure is exerted on the laid pipe, and it is expressed by the following equation, $$F_2 = \gamma \pi Dl \quad (2)$$

Accordingly, if $F_2 \geq F_1$, the pipe will not expand or contract against the earth on account of the temperature difference. The pipe length $l$ to satisfy the condition of $F_2 \geq F_1$ is derived from the equations (1) and (2) as follows:

$$l \geq \alpha(\theta_1-\theta_2)Et/\gamma \quad (3)$$

and the diameter of pipe comes to have no influence upon it.

$\gamma$ can be sought from the following equation:

$$\gamma = fP \quad (4)$$

A concrete example is illustrated as follows:

If a pipe is laid underground as deep as about 1 m., P=0.15 kg./cm.² and f=0.2, and hence $\gamma$=0.03 kg./cm.². Thus, if the pipe is a steel one, $\alpha$=12×10⁻⁶ and E=2.1×10⁶ kg./cm.². Provided that ($\theta_1-\theta_2$) be 20° C. and $t$ be 0.6 cm., $l$ is equal to 100 m.

Namely, in a pipeline which is laid underground at a distance as long as 100 m. or more, there is no relative expansion of pipe to the earth at a temperature difference of about 20° C. On the other hand, $$\sigma = \alpha(\theta_1-\theta_2)E \quad (5)$$

and in the above-mentioned example, $$\sigma \approx 500 \text{ kg./cm.}^2$$

and hence no failure of pipe occurs. Accordingly, for the laid pipe at a temperature difference of such extent, it is not necessary to take expansion into consideration. However, if the temperature difference exceeds 60° C., $\sigma$ becomes 1,500 kg./cm.² or more according to the equation (5), and exceeds the allowable stress of pipe. Thus, it is necessary to take the expansion of pipe into consideration in order to prevent its failure. For this purpose, the pipeline has heretofore had expansion joints or bends attached at an appropriate distance. But, it takes much cost and also is not easy in maintenance and inspection to install such equipment underground.

On the other hand, in case where a sufficiently long pipe laid underground is supposed to have a temperature difference of about 60° C., if the pipe can be laid underground after elongated by a length corresponding to a temperature which is 20°-30° C. higher than environmental temperature, and fixed by the pressure of the earth, the thermal stress in the operating state can be lessened to an extent corresponding to a temperature difference of 30°-40° C., and $\sigma$ can be made equal to 750 -1,000 kg./cm.² even in the case of a long-distance pipeline. Thus, it becomes possible to prevent the failure of pipe, without installing any expansion joint or bend. However, it is not easy to lay underground a long-distance pipeline while it is kept heated and elongated. In such a situation, one object of the present invention is to provide a method for preventing a long-distance pipeline laid underground and used at an elevated temperature, from being broken due to a thermal stress, without attaching any expansion joint or bend to the pipeline.

Another object of the present invention is to provide an expedient method for laying underground the above-mentioned long distance pipeline while it is heated and elongated.

It has been found that such objects can be attained by the following method of the present invention. The present invention consists in a method for laying underground a pipeline which is used in a state laid underground and heated to a higher temperature than that of the earth by means of a heat-generating pipe utilizing skin effect current, attached to each pipe of said pipeline, at the working time, which comprises a combination of steps consisting of (1) a step of heating each pipe of the pipeline by passing alternating current through the heat-generating pipe utilizing skin effect current attached to said each pipe to elongate said each pipe, to a length between the length of the pipe in the state showing no substantial stress in the longitudinal direction at the temperature of environmental earth and the length of the pipe in the state showing no substantial stress in the longitudinal direction at the operation temperature, (2) a step of connecting each pipe thus elongated, and (3) a step of backfilling the earth on each pipe, whereby said pipeline is fixed by the earth pressure.

The heat-generating pipe utilizing skin effect current to be used in the present invention means the one disclosed in Japanese Pat. No. 460,224 (U.S. Pat. No. 3,293,407) or the one disclosed in Japanese Pat. application No. 20427/1966 (U.S. Pat. No. 3,515,837).

Such heat-generating pipe utilizing skin effect current will be illustrated referring to the accompanying drawings.

FIG. 1 shows schematically the electrical circuit of a heat-generating pipe utilizing the skin effect of AC which AC flows from a source, through a conductor line and said heat-generating pipe to the source;

FIG. 2 shows schematically the electrical circuit of a heat-generating pipe utilizing the skin effect of single-phase AC induced in the skin portion of said heat-generating pipes by the AC flowing through conductor lines; and FIG. 3 shows schematically the electrical circuit of a heat-generating pipe utilizing the skin effect of three-phase AC induced in the skin portion of said heat-generating pipes by the AC flowing through conductor lines. These FIGS 1, 2 and 3 illustrate the principles of the heat-generating pipes utilizing skin effect current which are used in the present invention.

Figure 1:
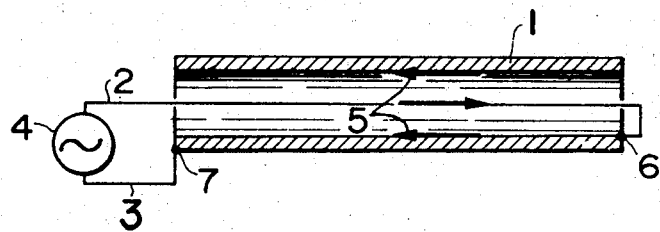

The heat-generating pipe shown in FIG. 1 is the skin effect heat-generating pipe described in the above-mentioned Japanese Pat. No. 460,224 (U.S. Pat. No. 3,293,407). In this FIGURE, an electric circuit is formed by passing an insulated wire 2 through the inside of a ferromagnetic pipe such as a steel pipe 1, connecting the insulated wire with the pipe at one end 6 of the pipe remote from an AC power source 4 and connecting the other end of the wire nearer to the source 4 to one terminal of the AC power source and one terminal 7 of the pipe nearer to the source to the other terminal of the power source. In such a circuit, if the resistivity of the ferromagnetic pipe is $\rho(\Omega\text{cm.})$, its permeability is $\mu$, and the frequency of the power source is $f$ (Hz.), $S$ (cm.) which is referred to as a skin depth of AC is expressed by a following formula, $$S = 5030\sqrt{\frac{\rho}{\mu f}} \qquad (6)$$

Also, if there is the following relationships among said $S$, the thickness of the pipe $t$ (cm.), the length $l$ (cm.) and the inner diameter $d$ (cm.):

$t > 2S, d >> S, l >> d$ (7) the alternating current 5 passing through the pipe 1 flows concentratedly on the inner wall skin portion of the pipe, and practically no potential appears on the outer surface of the pipe. Namely, even if the outer surface of the pipe is short circuited between two points thereon by means of a wire having a low impedance, practically no current flows. Accordingly, even if the steel pipe is welded directly to a material to be heated, it can be utilized as a safe heating element, i.e., a safe heat-generating pipe.

Figure 2:
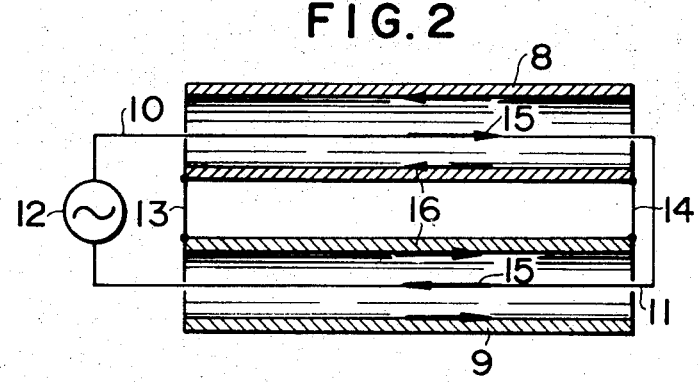
Figure 3:
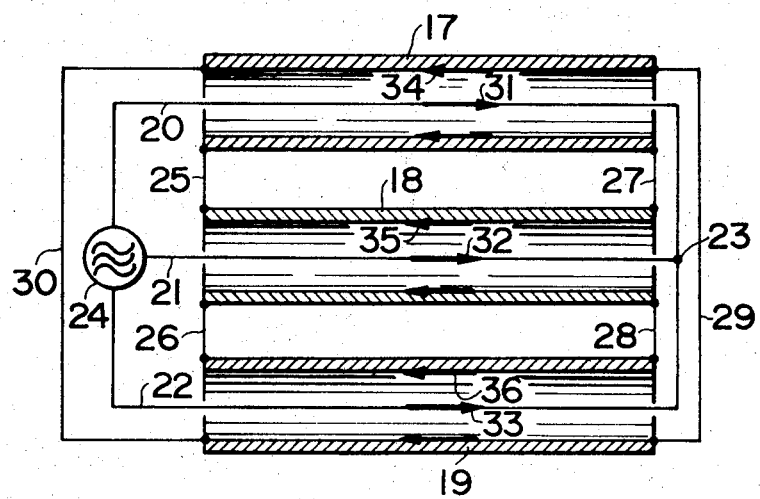

FIGS. 2 and 3 show the circuits in the heat-generating pipes utilizing skin effect current described in the above-mentioned Japanese Pat. application No. 12128/1965 U.S. Pat. No. 3,515,837). In FIG. 2, numerals 8 and 9 show ferromagnetic pipes, and a secondary circuit is formed by electrically connecting the ends of these pipes by means of conductors 13 and 14. A primary circuit is formed by an insulated wire 10, 11 connected to an AC power source 12 and passing through the insides of the pipes 8 and 9.

If the above-mentioned equations (6) and (7) are maintained in the above-mentioned case, the secondary current 16 corresponding to the primary one 15 flows concentratedly along the inner wall skin portion of the ferromagnetic pipes, and no potential appears on the outer surface thereof. Thus, such a pipe can be utilized as a safe heat-generating pipe, the heat source of which is the heat derived from the electric current flowing in the ferromagnetic pipe, as in FIG. 1.

The above-mentioned FIG. 2 is a circuit for a single phase AC but FIG. 3 is a circuit for a three-phase AC Numerals 17, 18 and 19 shows ferromagnetic pipes, numerals 25, 26, 27, 28, 29 and 30 show conductors connecting two of these pipes, and a secondary circuit is formed by connecting both the ends of the pipes as shown in the FIGURE. The primary circuit is formed by insulated wires 20, 21 and 22 connected to three-phase AC power source 24 and each passing through the insides of the ferromagnetic pipes 17, 18 and 19, numeral 23 being a common connecting point of these three wires.

If the two equations (6) and (7) are maintained also in this case, the respective secondary currents 34, 35 and 36 corresponding to primary currents 31, 32 and 33, flow along the inner wall skin portions of the ferromagnetic pipes, and no potential appears on the outer surfaces of the pipes. Thus, such pipes can be utilized as a safe heat-generating pipe, as in FIGS. 1 and 2.

Figure 4:
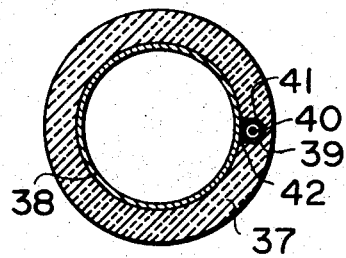
FIG. 4 shows, by cross-sectional view, one embodiment of skin effect heat-generating pipe attached to a pipeline.

FIG. 4 shows a schematic view of a transporting pipe 38 to which a heat-generating pipe utilizing skin effect current 41 is attached. In this FIGURE, the number of the heat-generating pipes is one, but it is possible to increase the number of pipe to two or more if necessary.

An insulated wire 40 passes through the inside of the ferromagnetic 39, and a current corresponding to the one flowing in the wire 40, i.e., a current having almost the same value with the one flowing in the wire 40 flows and generates heat along the inner wall skin portion of the ferromagnetic pipe 39. However, even though there is an electrical connection such as a welded part 42 between the transporting pipe 38 and the heat-generating pipe 41, practically no current flows on the transporting pipe.

Figure 5:
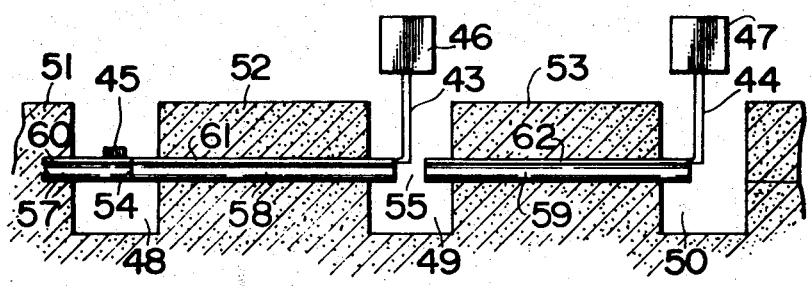
FIG. 5 shows by longitudinal cross-sectional view one embodiment of the present invention.

As mentioned above, the present invention is directed to a method for laying underground a pipeline to be heated by means of such heat-generating pipe, and it will be illustrated more fully by referring to FIG. 5.

In FIG. 5, numerals 57, 58 and 59 show transporting pipes to be laid underground; 60, 61 and 62 are heat-generating pipes of which explanation is given in FIGS. 1, 2, 3 and 4; 43 and 44 are feeders to these heat-generating pipes; 54 is a connecting box of the wires passing through the insides of the heat-generating pipes; 46 and 47 are AC power sources; 48, 49 and 50 are pits for the work of connecting the transporting pipes and heat-generating pipes the size of which is selected so as to be convenient for the work. The earth may be backfilled thereon; 51, 52 and 53 are backfill earth on the transporting pipes 57, 58 and 59, these pipes being fixed in earth by the pressure of earth of these parts; and 54 and 55 are connecting parts of the transporting pipes and heat-generating pipes. Among these the former 54 is an already connected part. Namely the laying and connecting works are carried out in the order of the pipes 57, 58 and 59, and the left side of the FIGURE shows a finished part, while the right side shows an unfinished part.

In this FIGURE, current for heating is passed through the heat-generating pipes 61 and 62 attached to the transporting pipes 58 and 59.

After completion, the heat-generating pipes 60, 61, 62, etc., are connected in series by means of a connecting box, in such a way that each length of the pipes corresponds to each voltage of power sources. In the heat-generating pipes 61 and 62 of FIG. 5, there is formed a circuit according to any one of those of FIGS. 1, 2 and 3.

As mentioned above, since the object of elongating the pipes by heating by means of the above-mentioned heat-generating pipes in laying the pipeline underground, is to lessen the thermal stress occurring in the pipes of the pipeline as low as possible, both at the time of suspension at environmental temperature and at the time of operation at an elevated temperature, it is suitable that heating temperature of the pipes by means of the above-mentioned heat-generating pipes, is approximately an intermediate temperature between environmental and operational temperatures. If a pipe is so fixed freely at the above-mentioned temperature that it can expand and a frictional force expressed by the equation (2) can be exerted between the pipe and the earth surrounding it, then a negative stress (tensile stress) occurs in the pipes at environmental temperature, while a positive stress (compression stress) occurs therein in an operation state, and both the stresses become almost equal.

In order to attain the above-mentioned object in the construction of the pipes 58 and 59 underground, there are several methods feasible.

In the first method, each pipe is laid underground except connecting part, heated by means of attached heat-generating pipes and elongated against the frictional force of the backfill earth, and thereafter each pipe is connected successively. The lengths of the pipes 58 and 59 are preferred to be short, in order that the elongating force occurring in the pipes may overcome the frictional force of the earth pressure, at the time when current is passing for heating, while the total connected length is preferred to be long in order that the pipes may be fixed by the earth pressure and a negative stress may be caused to occur in the pipes, at the time when connections of pipes are completed and the pipes are brought into a cooling state. Referring to the above-mentioned example, it is necessary that the lengths of the pipes are shorter than 100 m. at the time when the current is passing for heating, while the total connected length at the time when the pipes are brought into the cooling state is 100 m. or longer.

Thus, it is preferred to separate the power source apparatus for heating into two sections as shown in the FIGURE and control the powers for heating, in the pipes 58 and 59, independently. In other words, in connecting the pipes 58 and 59 at 55, it is preferable to make the length of the pipe 59 shorter in order to lessen the stress of the pies in a heated state, while it is preferable to make longer the total length of the pipes 57, 58, 59 as well as those to be connected further to the right side thereof, in order to cause a negative stress to occur in the pipe 58 brought about into the cooling state after completion of the connection.

Thus, it is preferred to separate the power source apparatus into two sections and pass currents separately in each laid pipe for the purpose of heating.

The second alternative method is to position a unit length of pipe along a trench way, to elongate the pipe by heating it up to a required temperature, and further to fix the pipe with the earth pressure by backfilling on the pipe the earth heated to a temperature almost equal to that of the pipe.

The third alternative method comprises supplying a small amount of backfill earth around each pipe so as to alleviate the frictional force to the pipe, heating the pipe by use of said heat-generating pipe together with the environmental earth up to a temperature higher than that of the earth but lower than that of the pipeline at the time of operation, and providing a required frictional force by further backfilling on the pipe the earth of environmental temperature to the ground level.

The above-mentioned second and third methods are employed in case of pipes having small heat capacity, because, if the earth at environmental temperature is backfilled on the pipes, and the pipes cool down, a desired elongation disappears and the occurrence of a given, negative internal stress, i.e., a tensile stress at environmental temperature becomes impossible.

However, if the pipe is surrounded by a heat-insulating layer 37 as shown in FIG. 4, it may be unnecessary to take the above-mentioned into consideration. Namely, as the fourth, alternative method, the pipe having an insulation layer is elongated by passing current through a heat-generating pipe for heating, and thereafter the earth at environmental temperature is backfilled on the pipe.

It is also possible to utilize an appropriate combination of the above-mentioned various methods. It goes without saying that after the power source apparatus 46 has achieved the object for heating the pipe, it can be detached and further utilized for heating a subsequent pipe.

The pipeline so connected and laid successively, is fixed at necessary locations, whereby a negative stress, i.e., a tensile stress remains in the pipeline at environmental temperature, but a stress higher than the allowable one (i.e., compression one) for the pipe material does not occur in the operating state, and hence it is unnecessary to use any expansion joint or bend over the total length of the pipeline. According to the method of the present invention, it is possible to carry out simply and economically the laying of a pipeline such as a transporting one for heavy oil to be operated at a higher temperature than environmental one.

What is claimed is:

1. A method for laying underground a pipeline formed of a plurality of interconned pies which is used for transporting a liquid as a higher temperature than that of the earth in which the pipeline is laid, which comprises a combination of steps consisting of
    1. a step of heating each pipe of the pipeline by passing alternating current through the heat-generating pipe utilizing skin effect current attached to said each pipe to elongate said each pipe, to a length between the length of the pipe in the state showing no substantial stress in the longitudinal direction at the temperature of environmental earth and the length of the pipe in the state showing no substantial stress in the longitudinal direction at the operation temperature,
    2. a step of connecting each pipe thus elongated, and
    3. a step of backfilling the earth on each pipe,
    whereby said pipeline is fixed by the earth pressure.
2. A method for laying underground a pipeline according to claim 1, which comprises burying in advance a greater portion of each pipe excepting connection parts with the earth, heating each pipe of said pipeline by passing alternating current through the heat-generating pipe attached to each pipe to elongate each pipe against the frictional force caused by the pressure of the earth, and then connecting each pipe to a subsequent pipe successively to form a pipeline laid underground.
3. A method for laying underground a pipeline according to claim 1, which comprises heating said each pipe to a temperature higher than that of the earth but lower than that of the pipeline at the time of operation, without the backfill earth around the pipe, by passing alternating current through said attached heat-generating pipe to elongate the pipe, and thereafter supplying around the pipe the backfill earth having been heated to a temperature almost equal to the above-mentioned one to fix each pipe by the earth pressure.
4. A method for laying underground a pipeline according to claim 1, which comprises supplying a small amount of backfill earth around each pipe so as to alleviate the frictional force to the pipe, heating the pipe by use of said heat-generating pipe together with the environmental earth up to a temperature higher than that of the earth but lower than that of the pipeline at the time of operation, and providing a required frictional force by backfilling on the pipe the earth at environmental temperature to the ground level.
5. A method for laying underground a pipeline according to claim 1 in which each pipe of the pipeline is covered by a thermally insulating layer in advance, before the step of heating.

* * * * *